United States Patent
Priest

(10) Patent No.: US 8,148,655 B2
(45) Date of Patent: Apr. 3, 2012

(54) PRESSURE SENSOR FOR A HERMETICALLY SEALED CONTAINER

(75) Inventor: Marcus Priest, Carpinteria, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 530 days.

(21) Appl. No.: 12/388,304

(22) Filed: Feb. 18, 2009

(65) Prior Publication Data

US 2010/0206708 A1    Aug. 19, 2010

(51) Int. Cl.
*H01H 35/34* (2006.01)
(52) U.S. Cl. .................................. 200/83 R; 200/83 A
(58) Field of Classification Search ........ 200/83 R–83 V
See application file for complete search history.

(56) References Cited

U.S. PATENT DOCUMENTS

| | | | |
|---|---|---|---|
| 3,717,734 A * | 2/1973 | Wertheimer et al. | 200/83 R |
| 3,771,121 A | 11/1973 | Lohr | |
| 3,850,039 A | 11/1974 | Brakebill | |
| 3,944,769 A * | 3/1976 | Wagner | 200/83 A |
| 4,000,386 A * | 12/1976 | Brouwer | 200/83 Q |
| 4,006,083 A * | 2/1977 | Westervelt et al. | 210/90 |
| 4,049,935 A * | 9/1977 | Gruber | 200/83 P |
| 4,894,497 A * | 1/1990 | Lycan | 200/83 R |
| 5,356,176 A | 10/1994 | Wells | |
| 5,604,338 A * | 2/1997 | Paxton et al. | 200/83 N |
| 6,484,555 B1 * | 11/2002 | Perry et al. | 73/1.71 |
| 6,596,951 B1 * | 7/2003 | Cusack | 200/83 P |
| 6,633,010 B2 * | 10/2003 | Tanaka et al. | 200/83 P |
| 7,453,049 B2 * | 11/2008 | Ochiai et al. | 200/83 A |

OTHER PUBLICATIONS

International Search Report, International Application No. PCT/US2010/000433, International Filing Date, Feb. 16, 2010.

* cited by examiner

*Primary Examiner* — Michael Friedhofer

(57) ABSTRACT

A pressure sensor is provided for a container having a hermetically sealed internal chamber. The pressure sensor includes a support member having a membrane side and an electrical contact extending along the membrane side. The support member is configured to be held by the container such that at least a portion of the support side is exposed to the internal chamber of the container. The pressure sensor also includes a membrane having a chamber side and an opposite support side. The membrane is held by the support member such that the chamber side is configured to be exposed to the internal chamber and the support side is configured to be isolated from the internal chamber. A pressure differential across the chamber side and the support side of the membrane deflects the membrane into and out of engagement with the electrical contact of the support member.

22 Claims, 4 Drawing Sheets

PRESSURE SENSOR FOR A HERMETICALLY SEALED CONTAINER

BACKGROUND OF THE INVENTION

The subject matter described and/or illustrated herein relates generally to hermetically sealed containers, and more particularly, to pressure sensors for hermetically sealed containers.

A variety of containers are hermetically sealed. For example, containers may be hermetically sealed to secure against the entry of microorganisms and/or to protect the contents of the container. Food, chemicals, and pharmaceuticals are often packaged in hermitically sealed containers. Many devices such as electronics, semiconductors, thermostats, optical devices, and/or switches are also held within hermetically sealed containers. For example, some electromagnetic relays are contained within hermetically sealed containers.

The internal chamber of a hermetically sealed container may contain gas or may be evacuated such that the chamber contains a complete or partial vacuum. However, for at least some known hermetically sealed containers, a pressure or vacuum within the chamber is not determinable after the chamber has been hermetically sealed. Accordingly, a loss of pressure or vacuum within the chamber may not be detected, which may damage or inhibit operation of the contents of the chamber. For example, hermetically sealed relays typically have stationary and moving contacts, and an actuating mechanism supported within a hermetically sealed chamber. To suppress arching between the moving and stationary contacts, the hermetically sealed chamber may be filled with an inert and/or insulating gas or may be evacuated so that the contacts coact in a complete or partial vacuum. Once the chamber of at least some known relays has been hermetically sealed, the pressure or presence of a vacuum within the chamber is not determinable. Loss of gas pressure or vacuum within the hermetically sealed chamber of the relay may therefore not be detected. Operation of a relay after an undetected loss of gas pressure or vacuum may cause the relay to suffer from arching between the moving and stationary contacts, which may damage or inhibit operation of the relay.

BRIEF DESCRIPTION OF THE INVENTION

In one embodiment, a pressure sensor is provided for a container having a hermetically sealed internal chamber. The pressure sensor includes a support member having a membrane side and an electrical contact extending along the membrane side. The support member is configured to be held by the container such that at least a portion of the support side is exposed to the internal chamber of the container. The pressure sensor also includes a membrane having a chamber side and an opposite support side. The membrane is held by the support member such that the chamber side is configured to be exposed to the internal chamber and the support side is configured to be isolated from the internal chamber. A pressure differential across the chamber side and the support side of the membrane deflects the membrane into and out of engagement with the electrical contact of the support member.

Optionally, the support member includes an electrical circuit, wherein the electrical contact forms a portion of the circuit, and wherein engagement between the membrane and the electrical contact closes the circuit and disengagement of the membrane from the electrical contact opens the circuit. The membrane side of the support member optionally includes a cavity extending therein, wherein the membrane optionally covers the cavity on the membrane side such that at least a portion of the cavity is isolated from the internal chamber of the container. The cavity optionally extends through both the membrane and exterior sides of the support member. Optionally, the support member includes another electrical contact and the membrane includes an edge portion that is electrically connected to the other electrical contact. A greater pressure across the chamber side of the membrane optionally deflects the membrane into engagement with the electrical contact of the support member. Optionally, at least a portion of the membrane is electrically conductive. The support member optionally includes a printed circuit. Optionally, the support side of the membrane generally faces the membrane side of the support member.

In another embodiment, a container includes a housing having an internal chamber. The internal chamber is hermetically sealed. The container also includes a support member including a membrane side and an electrical contact extending along the membrane side. The support member is held by the housing such that at least a portion of the support side is exposed to the internal chamber of the housing. The container also includes a membrane comprising a chamber side and an opposite support side. The membrane is held by the support member such that the chamber side is exposed to the internal chamber and the support side is isolated from the internal chamber. A pressure differential across the chamber side and the support side of the membrane deflects the membrane into and out of engagement with the electrical contact of the support member.

Optionally, the support member includes an electrical circuit, wherein the electrical contact forms a portion of the circuit, and wherein engagement between the membrane and the electrical contact closes the circuit and disengagement of the membrane from the electrical contact opens the circuit. The membrane side of the support member optionally includes a cavity extending therein, wherein the membrane optionally covers the cavity on the membrane side such that at least a portion of the cavity is isolated from the internal chamber of the housing. Optionally, the support member includes another electrical contact and the membrane includes an edge portion that is electrically connected to the other electrical contact. A greater pressure across the chamber side of the membrane optionally deflects the membrane into engagement with the electrical contact of the support member. Optionally, the internal chamber includes a complete or partial vacuum or gas at a pressure greater than atmospheric pressure. The support member optionally defines at least a portion of a lid of the container. Optionally, the support member includes a printed circuit.

In another embodiment, an electromechanical relay includes a housing having an internal chamber. The internal chamber is hermetically sealed. The electromechanical relay also includes a stationary contact having a portion that extends within the interior chamber of the housing, and a movable contact held within the interior chamber of the housing. The movable contact is movable between an open position wherein the movable contact does not engage the stationary contact and a closed position wherein the movable contact engages the stationary contact. The electromechanical relay also includes a pressure sensor operatively connected to the interior chamber of the housing such that the pressure sensor is configured to indicate a loss of gas pressure or a complete or partial vacuum within the interior chamber of the housing.

Optionally, the pressure sensor includes a support member having a membrane side and an electrical contact extending along the membrane side. The support member is optionally held by the housing such that at least a portion of the support side is exposed to the internal chamber of the housing. The pressure sensor optionally includes a membrane having a chamber side and an opposite support side. The membrane is optionally held by the support member such that the chamber side is exposed to the internal chamber and the support side is isolated from the internal chamber. Optionally, a pressure differential across the chamber side and the support side of the membrane deflects the membrane into and out of engagement with the electrical contact of the support member. The stationary contact is optionally held by the support member.

DETAILED DESCRIPTION OF THE INVENTION

Figure 1:
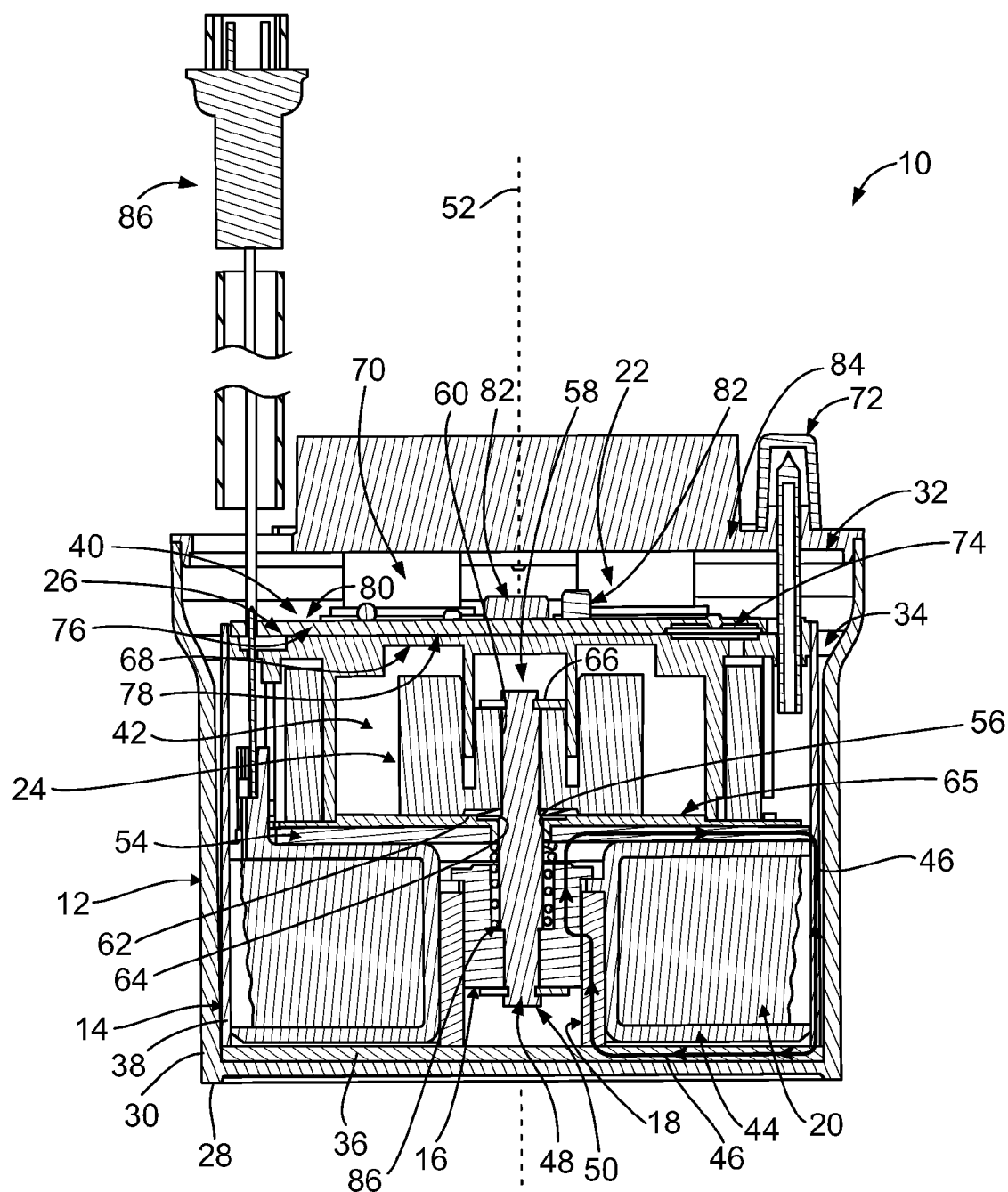
FIG. 1 is a cross-sectional view of an exemplary embodiment of an electromechanical relay.

FIG. 1 is a cross-sectional view of an exemplary embodiment of an electromechanical relay 10. The relay 10 includes an outer housing 12, an inner housing 14, an armature 16, an inner core 18, a coil 20, a plurality of stationary contact assemblies 22, one or more movable contacts 24, and a support member 26. The support member 26 may be commonly referred to as a "lid" or a "header". The relay 10 may be considered a "container". The outer housing 12 includes a bottom wall 28, a side wall 30 extending from the bottom wall 28, and an open end 32. The side and bottom walls 30 and 28, respectively, define a chamber 34 extending between the bottom wall 28 and the open end 32. The inner housing 14 is held within the chamber 34 of the outer housing 12. Similar to the outer housing 12, the inner housing 14 includes a bottom wall 36, a side wall 38 extending from the bottom wall 36, and an open end 40. The side and bottom walls 38 and 36, respectively, define an internal chamber 42 extending between the bottom wall 36 and the open end 40 of the inner housing 14.

The coil 20 is wound on a bobbin 44 held within the internal chamber 42 of the inner housing 14 adjacent the bottom wall 36. The coil 20 surrounds the inner core 18, which is fabricated from a ferromagnetic material and is also held within the internal chamber 42 of the inner housing 14 adjacent the bottom wall 36. The relay 10 may optionally include an internal coil control circuit (not shown) configured to regulate power dissipated by the coil 20 when energized. The inner core 18 acts as a part of a primary magnetic circuit 46 of the relay 10 for directing the magnetic flux generated by the coil 20. The inner core 18 surrounds the armature 16, which is fabricated from a ferromagnetic material and is connected to a shaft, or insulated rod, 48 adjacent an end portion 50 of the insulated rod 48. The insulated rod 48 is fabricated from a non-ferromagnetic material and/or non-metallic insulating material, such as, but not limited to, a glass filled nylon material and/or other polymers such as, but not limited to, polyamide, polyester, polyethylene terephthalate (PET), polyolefin, and/or the like. The armature 16 is connected to the insulated rod 48 for movement therewith and is slidably movable relative to the inner core 18 via movement of the insulated rod 48 along a longitudinal axis 52 of the relay 10. The coil 20, the inner core 18, and the armature 16 are sandwiched between the bottom wall 36 of the inner housing 14 and a top core 54 held within the internal chamber 42. The top core 54 is fabricated from a ferromagnetic material and includes an opening 56. A portion of the insulated rod 48 extends through the opening 56. The opening 56 and the insulated rod 48 are sized to allow movement of the insulated rod 48 through the opening 56 and relative to the top core 54. Optionally, a bearing (not shown) and/or bushing (not shown) may be provided between the insulated rod 48 and the top core 54 to reduce friction and thereby facilitate movement of the insulated rod 48 through the opening 56.

In the exemplary embodiment, the inner housing 14 forms a portion of the primary magnetic circuit 46 of the relay 10. Specifically, the coil 20, the inner core 18, the armature 16, and the top core 54 form a portion of a magnetic circuit. In the exemplary embodiment, the inner housing 14 is fabricated from a ferromagnetic material and the top core 54 is positioned within the internal chamber 42 of the inner housing 14 in close proximity with the side wall 38 of the inner housing 14 such that the inner housing 14 forms a magnetic return from the top core 54 to the coil 20. The inner housing 14 thus forms an outer core surrounding the coil 20 in the exemplary embodiment. The inner housing 14 may be fabricated from any ferromagnetic material that enables the inner housing 14 to form a magnetic return from the top core 54 to the coil 20, such as, but not limited to, an iron based alloy and/or the like. The outer housing 12 of the relay 10 may be fabricated from one or more non-electrically conductive and/or dielectric materials, such as, but not limited to glass filled nylon material and/or other polymers such as, but not limited to, polyamide, polyester, polyethylene terephthalate (PET), polyolefin, and/or the like. For example, the outer housing 12 may be fabricated from one or more non-electrically conductive and/or dielectric materials to prevent a person or object from becoming a portion of the magnetic circuit of the relay 10 by contacting the outer housing 12. In alternative embodiments, the inner housing 14 is not fabricated from a ferromagnetic material and the relay 10 includes a separate ferromagnetic component (not shown) that surrounds the coil 20 and engages the top core 54 to provide the magnetic return.

The movable contact 24 is connected to the insulated rod 48 adjacent an end portion 58 of the insulated rod 48 that is opposite the end portion 50. The movable contact 24 may be connected to the insulated rod 48 in any manner, configuration, and/or arrangement that enables the insulated rod 48 to function as described and/or illustrated herein. In the exemplary embodiment, the movable contact 24 includes an opening 60 that receives the end portion 58 of the insulated rod 48 therein. The movable contact 24 is connected to the insulated rod 48 for movement therewith, or more specifically such that movement of the insulated rod 48 along the longitudinal axis 52 causes movement of the movable contact 24 along the longitudinal axis 52. However, the moveable contact 24 is also connected to the insulated rod 48 such that the movable contact 24 is slidably movable along, and with respect to, the insulated rod 48, as will be described below with regard to the operation of the relay 10. The opening 60 and the insulated rod 48 are sized to allow movement of the insulated rod 48 through the opening 60 and relative to the movable contact 24. Optionally, a bearing (not shown) and/or bushing (not shown) may be provided between the insulated rod 48 and the movable contact 24 to reduce friction and thereby facilitate movement of the insulated rod 48 through the opening 60.

To allow the movable contact 24 to move with, and also relative to, the insulated rod 48, a helical spring 62 surrounds a portion of the insulated rod 48 extending between the movable contact 24 and a flange, or ledge, 64 of the insulated rod 48. Operation of the spring 62 to allow the moveable contact 24 to move with, and also relative to, the insulated rod 48 is described below with regard to the operation of the relay 10. The spring 62 engages the movable contact 24 and the ledge 64 of the insulated rod 48. The spring 62 is insulated from the top core by a spacer 65. A clip 66 or any other type of fastener may be provided on the insulated rod 48 over the movable contact 24 to prevent the end portion 58 of the insulated rod 48 from moving back through the opening 60 of the movable contact 24. Although the spring 62 is described and illustrated herein as a helical spring, the spring 62 may be any other spring and/or biasing mechanism that enables the spring 62 to function as described herein.

The movable contact 24 may be fabricated from a non-ferromagnetic material such as, but not limited to, copper, but may include any other contact material such as, but not limited to, silver alloys, tungsten, molybdenum, and/or the like. Although one movable contact 24 is illustrated, the relay may include two separate movable contacts, each for engaging a corresponding one of the stationary contact assemblies 22, which are connected to the insulated rod 48 and each other.

Each stationary contact assembly 22 includes a lower stationary contact 68 and an upper terminal 70 connected to the lower stationary contact 68. The stationary contact assemblies 22 are held in a fixed spaced relationship with respect to the movable contact 24 by the support member 26. The movable contact 24 is movable to engage and disengage the lower stationary contacts 68, which extend within the internal chamber 42 of the inner housing 14. Optionally, one or more permanent magnets (not shown) may be held in the internal chamber 42 of the inner housing 14 adjacent to the gaps between the movable contact 24 and the lower stationary contacts 68 to facilitate reducing and/or eliminating arcing between the movable contact 24 and the lower stationary contacts 68. One or more auxiliary contacts (not shown) may optionally be held in the internal chamber 42 of the inner housing 14. The auxiliary contact(s) may be configured to indicate a position of the movable contact 24 relative to the lower stationary contacts 68. The auxiliary contact(s) may have any configuration and/or arrangement, and/or may include any structure and/or means, that enable the auxiliary contact(s) to function as described herein. For example, the auxiliary contact(s) may include an actuating arm (not shown) connected to the movable contact 24, and a switch (not shown) operatively connected to the actuating arm.

The inner housing 14 functions as a sealing container for the electromagnetic components of the relay 10, i.e., all of the electromagnetic components are enclosed within the internal chamber 42 of the inner housing 14, with the exception of the upper terminals 70 of the stationary contact assemblies 22. The inner housing 14 may therefore be fabricated from a material that is substantially impermeable to air, inert gases, and/or insulative gases. The support member 26 seals the open end 40 of the inner housing 14 to thereby hermetically seal the internal chamber 42 of the inner housing 14. The support member 26 may be sealed to the inner housing 14 in any manner, configuration, arrangement, and/or the like, and/or using any means, process, method, structure, and/or the like that enables the support member 26 to hermetically seal the open end 40 of the inner housing 14. For example, the support member 26 may be sealed to the inner housing 14 using any type of weld, using any type of braze, using an epoxy, and/or the like.

The relay 10 may include an evacuation port 72 coupled in fluid communication with the internal chamber 42 of the inner housing 14 for removing gas from the internal chamber 42 and/or introducing gas into the internal chamber 42. Specifically, once the internal chamber 42 of the inner housing 12 has been hermetically sealed, the internal chamber 42 may be evacuated to a partial or complete vacuum, such as, but not limited to $10^{-5}$ Torr or less, using the evacuation port 72. Alternatively, the evacuation port 72 may be used to introduce any inert and/or insulative gas(es) into the internal chamber 42, such as, but not limited to, Hydrogen, Nitrogen, sulphur hexafluoride, and/or the like. The internal chamber 42 may be filled with gas to any pressure, such as, but not limited to, between approximately 5 to approximately 200 psi. Evacuating the internal chamber 42 to a partial or complete vacuum, or introducing inert and/or insulative gas(es) into the internal chamber 42 may facilitate suppressing arc formation within the internal chamber 42. Once the internal chamber 42 has been evacuated or filled, the evacuation port 72 may be pinched or capped to maintain the hermetic seal. In the exemplary embodiment, the support member 26 includes a pressure sensor 74 that, as will be described below, is configured to indicate a loss of gas pressure or a loss of complete or partial vacuum within the internal chamber 42 of the inner housing 14.

In the exemplary embodiment, the support member 26 is a printed circuit. As used herein, the term "printed circuit" is intended to mean any electric circuit in which the conducting connections have been printed or otherwise deposited in predetermined patterns on an insulating substrate. In the exemplary embodiment, the support member 26 includes a substrate 76 having a membrane side 78 and an opposite exterior side 80. Each of the membrane side 78 and the exterior side 80 optionally includes a plurality of electrical contacts (not shown in FIG. 1), a plurality of electrical traces (not shown in FIG. 1), and/or a plurality of electrical components 82 thereon. The substrate 76 may be a flexible substrate or a rigid substrate. The substrate 76 may be fabricated from and/or include any material(s), such as, but not limited to, ceramic, epoxy-glass, polyimide (such as, but not limited to, Kapton® and/or the like), organic material, plastic, polymer, and/or the like. In some embodiments, the substrate 76 is a rigid substrate fabricated from epoxy-glass, such that the support member 26 is what is sometimes referred to as a "circuit board". In the exemplary embodiment, the substrate 76 includes only a single layer. Alternatively, the substrate 76 may include any number of layers greater than one layer. For example, the substrate 76 may include two exterior layers that each defines one of the sides 78 and 80, with one or more interior layers sandwiched between the exterior layers. Each interior layer of the substrate 76 may include electrical contacts (not shown) and/or electrical traces (not shown) thereon. In alternative embodiments, the support member 26 is not a printed circuit.

A lid 84 covers at least a portion of the open end 32 of the outer housing 12. The lid 84 may be connected to the outer housing 12 in any manner, configuration, arrangement, and/or the like, and/or using any means, process, method, structure, and/or the like. In the exemplary embodiment, the portion of the chamber 34 of the outer housing 12 that extends between the support member 26 and the lid 84 is exposed to the atmosphere and is therefore at atmospheric pressure. Alternatively, the lid 84 hermetically seals the chamber 34 and the chamber 34 is evacuated to a partial or complete vacuum or is filled with any inert and/or insulative gas(es).

In operation, the relay 10 is biased to an open position shown in FIG. 1, wherein the movable contact 24 does not engage the lower stationary contacts 68. In the exemplary embodiment, a helical spring 86 surrounds a portion of the insulated rod 48 extending between the top core 54 and the armature 16. The spring 86 engages the armature 16 and the top core 54. When the coil 20 is energized using an electrical input 88, the insulated rod 48 and the armature 16 move along the longitudinal axis 52 toward the open end 40 of the inner housing 14. The movable contact 24 moves along with the insulated rod 48 until the movable contact 24 engages the lower stationary contacts 68 thereby making an electrical connection therebetween. As the insulated rod 48 continues to move along the longitudinal axis 52 toward the open end 40 of the inner housing 14, the movable contact 24 is restrained by the lower stationary contacts 68 and therefore slidably moves along, and with respect to, the insulated rod 48. As the movable contact 24 slidably moves along, and with respect to, the insulated rod 48, the spring 62 is compressed and thereby exerts a force on the movable contact 24 that facilitates maintaining the engagement between the movable contact 24 and the lower stationary contacts 68.

In alternative embodiments, rather than being biased to an open position, the relay 10 is biased to a closed position wherein the movable contact 24 engages the lower stationary contacts 68. For example, the relay 10 may be biased to a closed position using one or more permanent magnets (not shown) positioned between the bottom wall 36 of the inner housing 14 and the inner core 18. Although the spring 86 is described and illustrated herein as a helical spring, the spring 86 may be any other spring and/or biasing mechanism that enables the spring 86 to function as described herein. Moreover, although the relay 10 is described and illustrated herein as including pair of stationary contact assemblies 22 and one or more movable contacts 24 that engages the stationary contact assemblies 22 to make an electrical connection therebetween, the relay 10 may alternatively includes one or more other pairs of stationary contact assemblies (not shown) that are each engaged by one or more other movable contacts (not shown) to make an electrical connection between the stationary contact assemblies of the other pair(s). Such other movable contacts may be connected to the insulated rod 48 or may be driven by a separate coil, armature, and/or insulated rod assembly (not shown) contained within the internal chamber 42 of the inner housing 14. Although the inner housing 14 and the outer housing 12 are each illustrated as generally cylindrical, the housings 12 and 14 may each have any shape(s).

Figure 2:
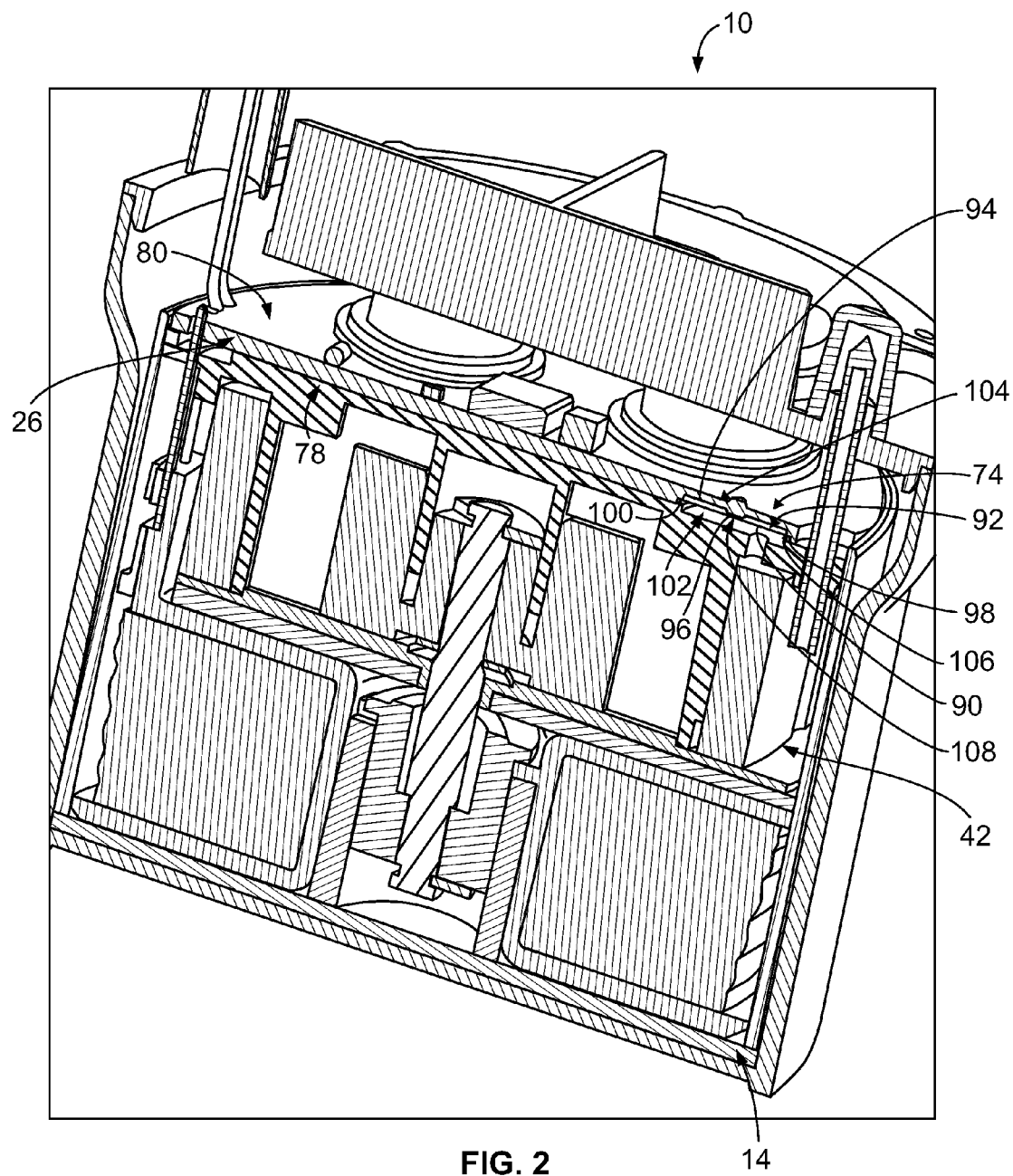
FIG. 2 is a perspective view illustrating the cross-section of the relay shown in FIG. 1.
Figure 3:
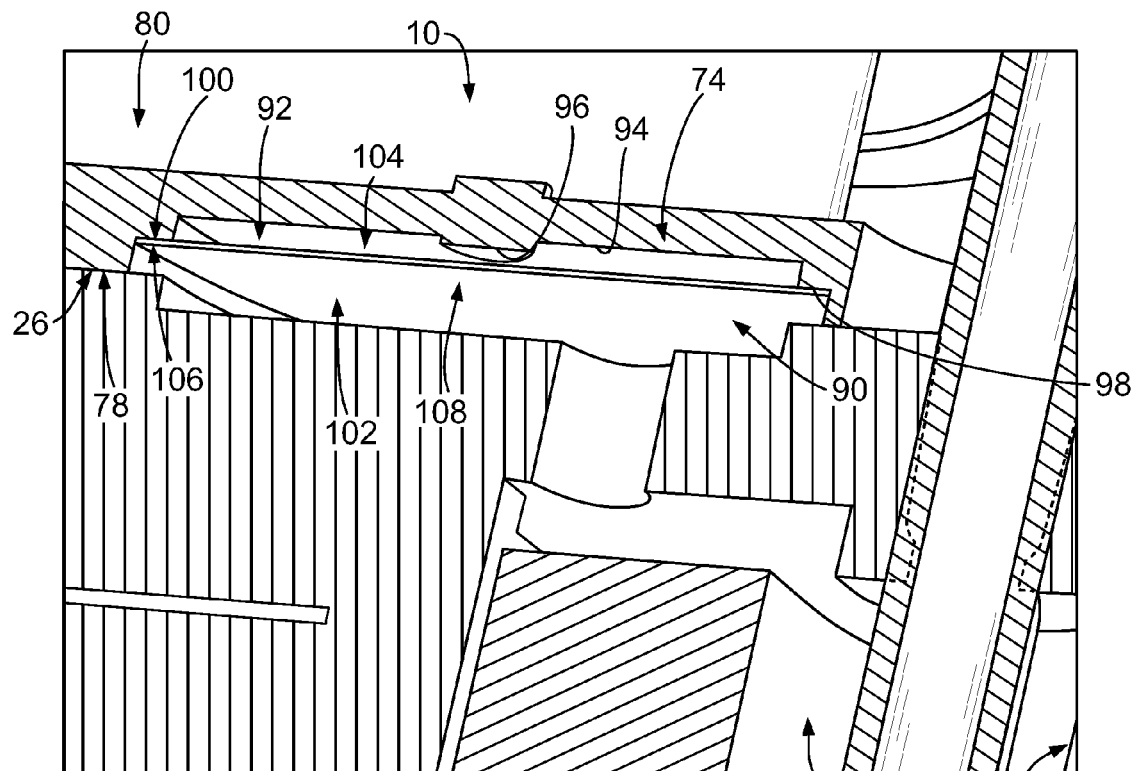
FIG. 3 is an enlarged perspective view of a portion of the cross section of the relay shown in FIG. 2.
Figure 4:
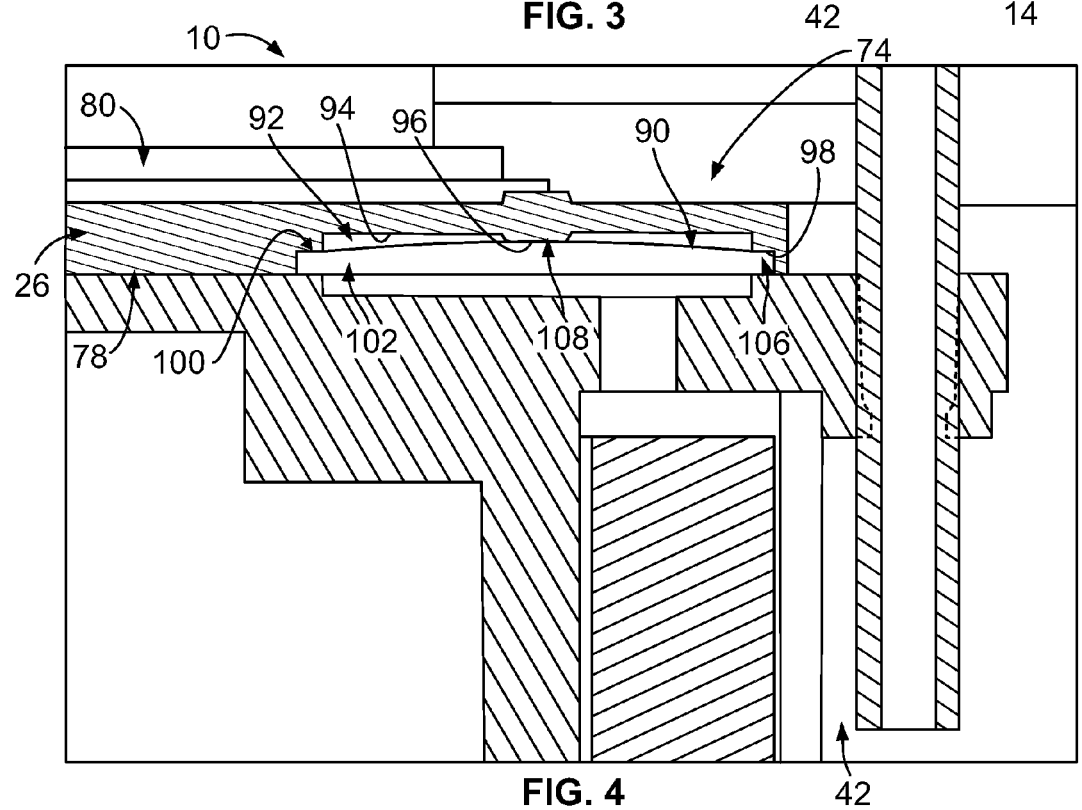
FIG. 4 is an enlarged cross-sectional view of a portion of the relay shown in FIGS. 1-3 illustrating an exemplary embodiment of a membrane of the relay in an engaged position.

FIG. 2 is a perspective view illustrating the cross-section shown in FIG. 1 of the relay 10. FIG. 3 is an enlarged perspective view of a portion of the cross section of the relay 10 shown in FIG. 2. FIG. 4 is an enlarged cross-sectional view of a portion of the relay 10 illustrating an exemplary embodiment of a membrane 90 of the relay 10 in an engaged position. The pressure sensor 74 includes the support member 26 and the membrane 90. As described above, the support member 26 includes a membrane side 78 and an exterior side 80. When the support member 26 is held by the inner housing 14, the membrane side 78 is exposed to the internal chamber 42 of the inner housing 14. A cavity 92 extends within the membrane side 78 of the support member 26. The cavity 92 includes a bottom wall 94 having an electrical contact 96 thereon. The electrical contact 96 therefore extends along the membrane side 78 of the support member 26. The membrane side 78 of the support member 26 also includes another electrical contact 98 extending therealong. In the exemplary embodiment, the cavity 92 includes a ledge 100 that includes the electrical contact 98 thereon. Alternatively, the electrical contact 98 is located on another portion of the membrane side 78 of the support member 26, whether or not the cavity 92 includes the ledge 100. The electrical contacts 96 and 98 form a portion of an electrical circuit of the support member 26.

The membrane 90 is mounted on the membrane side 78 of the support member 26. Specifically, the membrane 90 includes a chamber side 102 and an opposite support side 104. The membrane 90 is mounted on, and held by, the support member 26 such that the support side 104 generally faces the membrane side 78 of the support member 26 and such that the chamber side 102 is exposed to the internal chamber 42 of the inner housing 14. The membrane 90 covers the cavity 92 on the membrane side 78 of the support member 26 such that at least a portion of the cavity 92 is isolated from the internal chamber 42 of the inner housing 14. Accordingly, the support side 104 of the membrane 90 is isolated from the internal chamber 42 of the inner housing 14 and is exposed to the portion of the cavity 92 that is isolated from the internal chamber 42. In the exemplary embodiment, an edge portion 106 of the membrane 90 is hermetically sealed with the ledge 100 to isolate the portion of the cavity 92 from the internal chamber 42 of the inner housing 14. However, any other portion(s) of the membrane 90 may be hermetically sealed with any portion of the membrane side 78 of the support member to isolate the cavity 92 from the internal chamber 42 of the inner housing 14. In the exemplary embodiment, the edge portion 106 of the membrane 90 is hermetically sealed with the support member 26 using solder (not shown). However, the membrane 90 may be hermetically sealed with the support member 26 using any method, means, structure, and/or the like (whether or not such method, means, structure, and/or the like is electrically conductive), such as, but not limited to, welding, brazing, epoxy, and/or the like.

In the exemplary embodiment, the membrane 90 is fabricated as an electrically conductive sheet. The edge portion 106 of the membrane 90 is electrically connected to the electrical contact 98 on the ledge 100 of the support member cavity 92. The membrane 90 thereby forms an electrical contact that can be deflected into engagement with the electrical contact 96 to electrically connect the electrical contacts 96 and 98 together. Specifically, a pressure differential across the chamber side 102 and support side 104 of the membrane 90 deflects the membrane into and out of engagement with the electrical contact 96 on the bottom wall 94 of the support member cavity 92. Specifically, a greater pressure across the chamber side 102 deflects the membrane 90 from the disengaged position shown in FIGS. 2 and 3 to an engaged position (FIG. 4) wherein a portion 108 of the membrane 90 engages the electrical contact 96. The membrane 90 thereby forms a portion of the circuit of the support member 26 that includes the electrical contacts 96 and 98. Engagement of the membrane 90 with the electrical contact 96 closes the circuit, while disengagement of the membrane 90 from the electrical contact 96 opens the circuit. Specifically, in the exemplary embodiment, each of the electrical contacts 96 and 98 is electrically connected to a common electrical ground such that engagement between the membrane 90 and the electrical contact 96 completes the circuit between the electrical contacts 96 and 98. Alternatively, the circuit may include any other configuration, arrangement, interconnectivity, and/or the like that enables deflection of the membrane to open and close a circuit that includes the electrical contacts 96 and 98.

When the membrane 90 is fabricated as an electrically conductive sheet, the membrane 90 may be fabricated from any electrically conductive material(s), such as, but not limited to, copper, silver alloys, tungsten, molybdenum, and/or the like. In alternative embodiments, rather than being fabricated as an electrically conductive sheet, the membrane 90 may include a substrate (not shown) that includes one or more electrical trace (not shown) and/or one or more electrical contacts (not shown) thereon. One or more of the electrical trace(s) and/or the electrical contact(s) are electrically connected to the electrical contact 98, and one or more of the electrical trace(s) and/or the electrical contact(s) are engageable with the electrical contact 96 to electrically connect the electrical contacts 96 and 98 together. Although shown as including a disc shape, the membrane 90 may include any other shape(s). Moreover, the cavity 92 may include any other shape(s) than shown.

In operation when the internal chamber 42 of the inner housing 14 is filled with inert and/or insulating gas(es), the pressure within the cavity 92 of the support member 26 is selected as less than the pressure of the inert and/or insulating gas(es) within the internal chamber 42. The pressure within the cavity 92 may be set when the membrane 90 is hermetically sealed over the cavity 92. The greater pressure across the chamber side 102 deflects the membrane 90 to the engaged position shown in FIG. 4 wherein the portion 108 of the membrane 90 engages the electrical contact 96. Accordingly, the greater pressure across the chamber side 102 of the membrane 90 closes the electrical circuit of the electrical contacts 96 and 98. When gas pressure within the internal chamber 42 of the inner housing 14 falls below the pressure within the cavity 92, the greater pressure across the support side 104 of the membrane 90 deflects the membrane 90 back to the disengaged position shown in FIGS. 1 and 2 wherein the portion 108 of the membrane 90 is disengaged with the electrical contact 96. Accordingly, the greater pressure across the support side 104 of the membrane 90 opens the electrical circuit of the electrical contacts 96 and 98. A controller (not shown) and/or any other audio and/or visual indication device may be electrically connected to the circuit to provide an indication that the circuit is open or closed. The indication of whether the circuit is open or closed indicates whether gas pressure within the internal chamber 42 has fallen below a predetermined value. The pressure sensor 74 thereby indicates a loss of gas pressure within the internal chamber 42 of the inner housing 14.

The pressure within the cavity 92 can be selected as any pressure that is lower than the predetermined gas pressure within the internal chamber 42, such as, but not limited to, atmospheric pressure, a complete or partial vacuum, and/or the like. In embodiments wherein the pressure within the cavity is a complete or partial vacuum, a natural bias of the membrane 90 to the disengaged position shown in FIGS. 2 and 3 may deflect the membrane 90 out of engagement with the electrical contact 96 when the pressure across the chamber side 102 is approximately equal to the pressure across the support side 104.

In operation when the internal chamber 42 of the inner housing 14 is a complete or partial vacuum, the pressure within the cavity 92 of the support member 26 is selected as greater than the pressure of the complete or partial vacuum within the internal chamber 42. The greater pressure across the support side 104 deflects the membrane 90 to the disengaged position shown in FIGS. 2 and 3 wherein the portion 108 of the membrane 90 is disengaged from the electrical contact 96. Accordingly, the greater pressure across the support side 104 of the membrane 90 opens the electrical circuit of the electrical contacts 96 and 98. When gas pressure within the internal chamber 42 of the inner housing 14 increases above the pressure within the cavity 92, the greater pressure across the chamber side 102 of the membrane 90 deflects the portion 108 of the membrane 90 into engagement with the electrical contact 96. Accordingly, the greater pressure across the chamber side 102 of the membrane 90 closes the electrical circuit of the electrical contacts 96 and 98. The indication of whether the circuit is open or closed indicates whether the pressure within the internal chamber 42 has risen above a predetermined value. The pressure sensor 74 thereby indicates a loss of a complete or partial vacuum within the internal chamber 42 of the inner housing 14.

The pressure within the cavity 92 can be selected as any pressure that is higher than the complete or partial vacuum within the internal chamber 42, such as, but not limited to, atmospheric pressure, a pressure higher than atmospheric, and/or the like. In some embodiments, a natural bias of the membrane 90 to the disengaged position shown in FIGS. 2 and 3 may deflect the membrane 90 out of engagement with the electrical contact 96 when the pressure across the chamber side 102 is approximately equal to the pressure across the support side 104.

Figure 5:
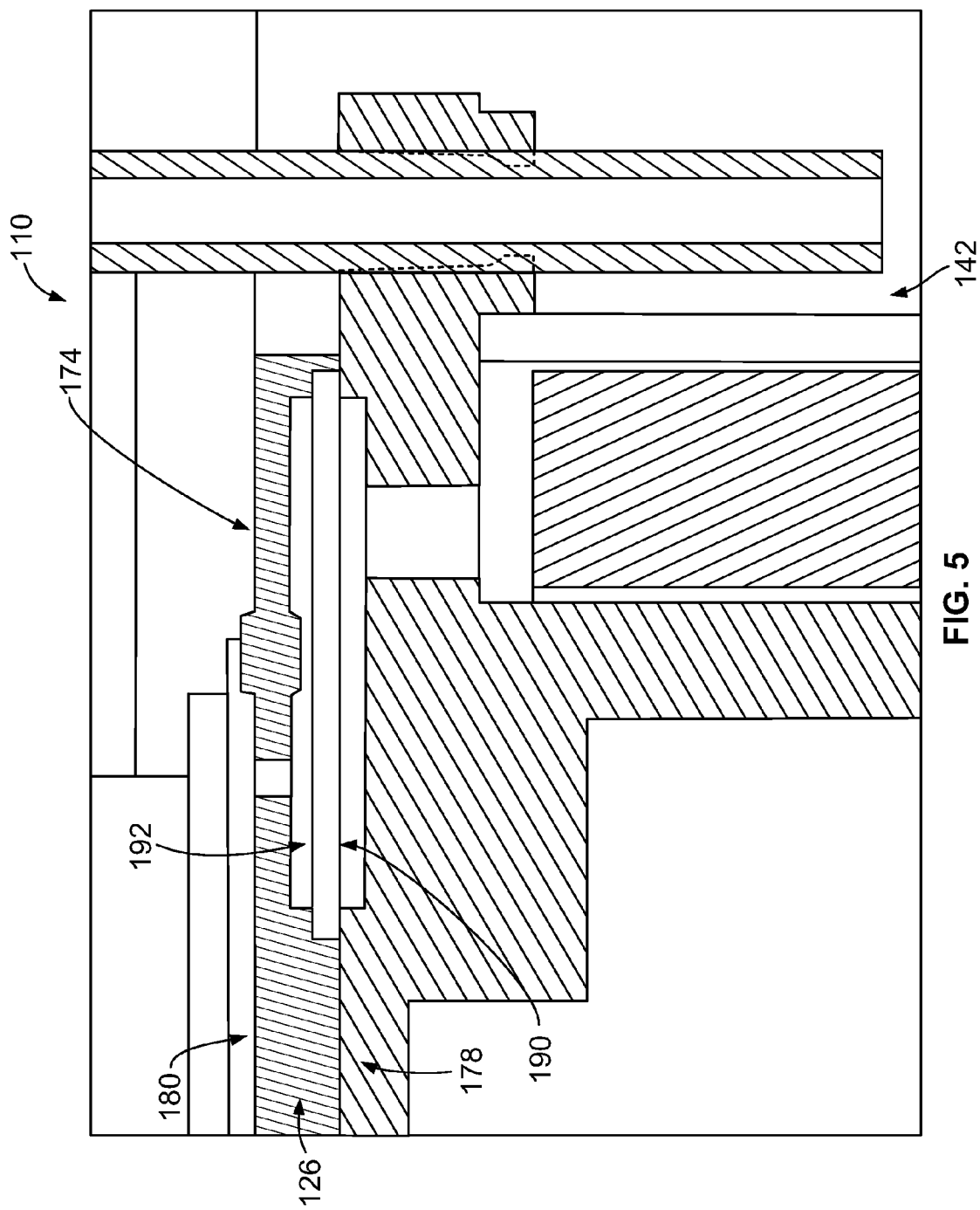
FIG. 5 is a cross-sectional view of a portion of an alternative embodiment of an electromagnetic relay.

In the exemplary embodiment of FIGS. 1-4, the cavity 92 extends only partially through the support member 26 such that the cavity 92 does not extend through the exterior side 80. Alternatively, the cavity 92 extends exterior side 80. For example, FIG. 5 is a cross-sectional view of a portion of an alternative embodiment of an electromagnetic relay 110. The relay 110 includes a pressure sensor 174 having a support member 126 and a membrane 190. The support member 126 includes a membrane side 178 and an exterior side 180. The membrane side 78 is exposed to a hermetically sealed internal chamber 142 of the relay 110. A cavity 192 extends within the membrane side 178 and through the exterior side 180 of the support member 126. The cavity 192 is thus in fluid communication with the exterior side 180 of the support member 126.

Although the pressure sensor embodiments described and/or illustrated herein are described and illustrated herein with reference to an electromechanical relay, the pressure sensor embodiments described and/or illustrated herein are not limited to use with electromagnetic relays. Rather, the pressure sensor embodiments described and/or illustrated herein may be used with any hermetically sealed container.

The embodiments described and/or illustrated herein provide a pressure sensor for sensing gas pressure or vacuum within the internal chamber of a hermetically sealed container. For example, the embodiments described and/or illustrated herein provide a pressure sensor for sensing whether the hermetically sealed chamber of an electromagnetic relay has lost gas pressure or vacuum.

Exemplary embodiments are described and/or illustrated herein in detail. The embodiments are not limited to the specific embodiments described herein, but rather, components and/or steps of each embodiment may be utilized independently and separately from other components and/or steps described herein. Each component, and/or each step of one embodiment, can also be used in combination with other components and/or steps of other embodiments. When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Moreover, the terms "first," "second," and "third," etc. in the claims are used merely as labels, and are not intended to impose numerical requirements on their objects. Dimensions, types of materials, orientations of the various components, and the number and positions of the various components described and/or illustrated herein are intended to define parameters of certain embodiments, and are by no means limiting and are merely exemplary embodiments. Many other embodiments and modifications within the spirit and scope of the claims will be apparent to those of skill in the art upon reviewing the description and illustrations. The scope of the subject matter described and/or illustrated herein should therefore be determined with reference to the appended claims, along with the full scope of equivalents to which such claims are entitled. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A pressure sensor for a container having a hermetically sealed internal chamber, said pressure sensor comprising:
   a support member comprising a membrane side and an electrical contact extending along the membrane side, the support member being configured to be held by the container such that at least a portion of the membrane side is exposed to the internal chamber of the container; and
   a membrane comprising a chamber side and an opposite support side, the membrane being held by the support member such that the chamber side is configured to be exposed to the internal chamber and the support side is configured to be isolated from the internal chamber, wherein a pressure differential across the chamber side and the support side of the membrane deflects the membrane into and out of engagement with the electrical contact of the support member.

2. The pressure sensor according to claim 1, wherein the support member comprises an electrical circuit, the electrical contact forming a portion of the circuit, and wherein engagement between the membrane and the electrical contact closes the circuit and disengagement of the membrane from the electrical contact opens the circuit.

3. The pressure sensor according to claim 1, wherein the membrane side of the support member comprises a cavity extending therein, the membrane covering the cavity on the membrane side such that at least a portion of the cavity is isolated from the internal chamber of the container.

4. The pressure sensor according to claim 1, wherein the support member comprises an exterior side, the membrane side comprising a cavity extending therein, the membrane covering the cavity on the membrane side such that at least a portion of the cavity is isolated from the internal chamber of the container, wherein the cavity extends through both the membrane and exterior sides of the support member.

5. The pressure sensor according to claim 1, wherein the support member comprises another electrical contact, the membrane comprising an edge portion that is electrically connected to the other electrical contact.

6. The pressure sensor according to claim 1, wherein a greater pressure across the chamber side of the membrane deflects the membrane into engagement with the electrical contact of the support member.

7. The pressure sensor according to claim 1, wherein at least a portion of the membrane is electrically conductive.

8. The pressure sensor according to claim 1, wherein the support member comprises a printed circuit.

9. The pressure sensor according to claim 1, wherein the support side of the membrane generally faces the membrane side of the support member.

10. The pressure sensor according to claim 1, wherein the membrane comprises an electrically conductive sheet.

11. The pressure sensor according to claim 1, wherein the membrane comprises a substrate having at least one of an electrical trace or an electrical contact thereon.

12. A container comprising:
    a housing having an internal chamber, the internal chamber being hermetically sealed;
    a support member comprising a membrane side and an electrical contact extending along the membrane side, the support member being held by the housing such that at least a portion of the membrane side is exposed to the internal chamber of the housing; and
    a membrane comprising a chamber side and an opposite support side, the membrane being held by the support member such that the chamber side is exposed to the internal chamber and the support side is isolated from the internal chamber, wherein a pressure differential across the chamber side and the support side of the membrane deflects the membrane into and out of engagement with the electrical contact of the support member.

13. The container according to claim 12, wherein the support member comprises an electrical circuit, the electrical contact forming a portion of the circuit, and wherein engagement between the membrane and the electrical contact closes the circuit and disengagement of the membrane from the electrical contact opens the circuit.

14. The container according to claim 12, wherein the membrane side of the support member comprises a cavity extending therein, the membrane covering the cavity on the membrane side such that at least a portion of the cavity is isolated from the internal chamber of the housing.

15. The container according to claim 12, wherein the support member comprises another electrical contact, the membrane comprising an edge portion that is electrically connected to the other electrical contact.

16. The container according to claim 12, wherein a greater pressure across the chamber side of the membrane deflects the membrane into engagement with the electrical contact of the support member.

17. The container according to claim 12, wherein the internal chamber comprises one of:
    one of a complete and partial vacuum; and
    gas at a pressure greater than atmospheric pressure.

18. The container according to claim 12, wherein the support member defines at least a portion of a lid of the container.

19. The container according to claim 12, wherein the support member comprises a printed circuit.

20. An electromechanical relay comprising:
    a housing having an internal chamber, the internal chamber being hermetically sealed;
    a stationary contact having a portion that extends within the interior chamber of the housing;
    a movable contact held within the interior chamber of the housing, the movable contact being movable between an open position wherein the movable contact does not engage the stationary contact and a closed position wherein the movable contact engages the stationary contact; and
    a pressure sensor operatively connected to the interior chamber of the housing such that the pressure sensor is configured to indicate a loss of one of gas pressure and one of a complete and partial vacuum within the interior chamber of the housing.

21. The electromechanical relay according to claim 20, wherein the pressure sensor comprises:
    a support member comprising a membrane side and an electrical contact extending along the membrane side, the support member being held by the housing such that at least a portion of the membrane side is exposed to the internal chamber of the housing; and a membrane comprising a chamber side and an opposite support side, the membrane being held by the support member such that the chamber side is exposed to the internal chamber and the support side is isolated from the internal chamber, wherein a pressure differential across the chamber side and the support side of the membrane deflects the membrane into and out of engagement with the electrical contact of the support member.

22. The electromechanical relay according to claim 21, wherein the stationary contact is held by the support member.

* * * * *